US011912028B2

(12) United States Patent
Hirohara et al.

(10) Patent No.: US 11,912,028 B2
(45) Date of Patent: Feb. 27, 2024

(54) SUBSTRATE FOR LIQUID EJECTION HEAD AND LIQUID EJECTION HEAD

(71) Applicant: CANON KABUSHIKI KAISHA, Tokyo (JP)

(72) Inventors: Mai Hirohara, Kanagawa (JP); Kenji Takahashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 97 days.

(21) Appl. No.: 17/520,514

(22) Filed: Nov. 5, 2021

(65) Prior Publication Data

US 2022/0153023 A1 May 19, 2022

(30) Foreign Application Priority Data

Nov. 13, 2020 (JP) ................................ 2020-189845

(51) Int. Cl.
*B41J 2/14* (2006.01)

(52) U.S. Cl.
CPC ....... *B41J 2/14129* (2013.01); *B41J 2/14032* (2013.01); *B41J 2/14088* (2013.01); *B41J 2/14* (2013.01); *B41J 2202/03* (2013.01)

(58) Field of Classification Search
CPC ................ B41J 2/14129; B41J 2/14032; B41J 2/14088; B41J 2/14; B41J 2202/03
See application file for complete search history.

(56) References Cited

U.S. PATENT DOCUMENTS

| | | | | |
|---|---|---|---|---|
| 10,906,305 | B2 * | 2/2021 | Teshima | H01L 27/00 |
| 11,001,062 | B2 * | 5/2021 | Teranishi | B41J 2/1631 |
| 2022/0153026 | A1 * | 5/2022 | Minami | B41J 2/1626 |

FOREIGN PATENT DOCUMENTS

| | | | |
|---|---|---|---|
| CN | 1341514 | A | 3/2002 |
| CN | 108973332 | A | 12/2018 |
| JP | H05-198865 | A | 8/1993 |
| JP | H11-10882 | A | 1/1999 |
| JP | 2009-113302 | A | 5/2009 |
| JP | 2016137705 | A | 8/2016 |
| TW | 506905 | B | 10/2002 |

* cited by examiner

*Primary Examiner* — Geoffrey S Mruk
(74) *Attorney, Agent, or Firm* — CANON U.S.A., INC. IP Division

(57) ABSTRACT

A substrate for liquid ejection head comprising, a base material, a heating element including a heating resistor layer for generating thermal energy for discharging a liquid, a wiring layer for supplying electric power to the heating element, and an interlayer insulating film for insulating the heating resistor layer and the wiring layer. A part of a first interlayer insulating film for insulating the heating resistor layer and a first wiring layer adjacent to the heating resistor layer, and a second interlayer insulating film for insulating the first wiring layer and a second wiring layer adjacent to the second interlayer insulating film, includes a material layer represented by $Si_wO_xC_yN_z$ (w+x+y+z=100 (at. %), 37≤w≤60 (at. %), 30≤x≤53 (at. %), 6≤y≤−29 (at. %), 4≤z≤9 (at. %)).

15 Claims, 7 Drawing Sheets

SUBSTRATE FOR LIQUID EJECTION HEAD AND LIQUID EJECTION HEAD

BACKGROUND OF THE INVENTION

Field of the Invention

The present disclosure relates to a substrate for liquid ejection head and a liquid ejection head.

Description of the Related Art

One of the recording methods using a typical inkjet head as a liquid ejection head is a method in which ink is heated and foamed by a heating element and ink is ejected by utilizing the bubbles.

Japanese Patent Application Laid-Open No. 2016-137705 discloses the use of an insulator such as SiO as an interlayer insulating film for electrically insulating multiple electric wiring layers or between an electric wiring layer and a heating resistance element.

In an inkjet head disclosed in Japanese Patent Application Laid-Open No. 2016-137705 in which SiO is applied to an interlayer insulating film, when the inkjet head is used for a long period of time in a state in which ink has intruded into a substrate for liquid ejection head due to accidental disconnection or the like, the interlayer insulating film may be dissolved by the ink. When ink reaches an electric wiring layer common to multiple elements due to dissolution of the interlayer insulating film, ink cannot be ejected even from adjacent elements.

As described above, it is a disadvantage that the reliability of the inkjet head is lowered by dissolution of the interlayer insulating film. It should be noted that the interlayer insulating film of the substrate for liquid ejection head is required to satisfy performance such as electrical insulation and low stress in addition to dissolution resistance to ink.

SUMMARY OF THE INVENTION

It is therefore an aspect of the present disclosure to provide a liquid ejection head substrate having a longer life by suppressing the deterioration of reliability of a liquid ejection head due to the dissolution of an interlayer insulating film while satisfying the performance required as an interlayer insulating film such as electrical insulation and low stress.

A liquid ejection head substrate of the present disclosure is a substrate for liquid ejection head having a base material, a heating element including a heating resistor layer for generating thermal energy for discharging a liquid, a wiring layer for supplying electric power to the heating element, and an interlayer insulating film for insulating the heating resistor layer and the wiring layer.

A part of a first interlayer insulating film for insulating the heating resistor layer and a first wiring layer adjacent to the heating resistor layer, and a second interlayer insulating film for insulating the first wiring layer and a second wiring layer adjacent to the second interlayer insulating film includes a material layer represented by $Si_wO_xC_yN_z$ (w+x+y+z=100 (at. %), 37≤w≤60 (at. %), 30≤x≤53 (at. %), 6≤y≤29 (at. %), 4≤z≤9 (at. %)).

According to the present disclosure, it is possible to provide a substrate for liquid ejection head having a longer service life by suppressing deterioration in reliability of the liquid ejection head due to dissolution of an interlayer insulating film caused by a liquid such as ink while satisfying performance required as an interlayer insulating film such as electrical insulation and low stress.

Further features of the present disclosure will become apparent from the following description of exemplary embodiments with reference to the attached drawings.

DESCRIPTION OF THE EMBODIMENTS

Figure 1A:
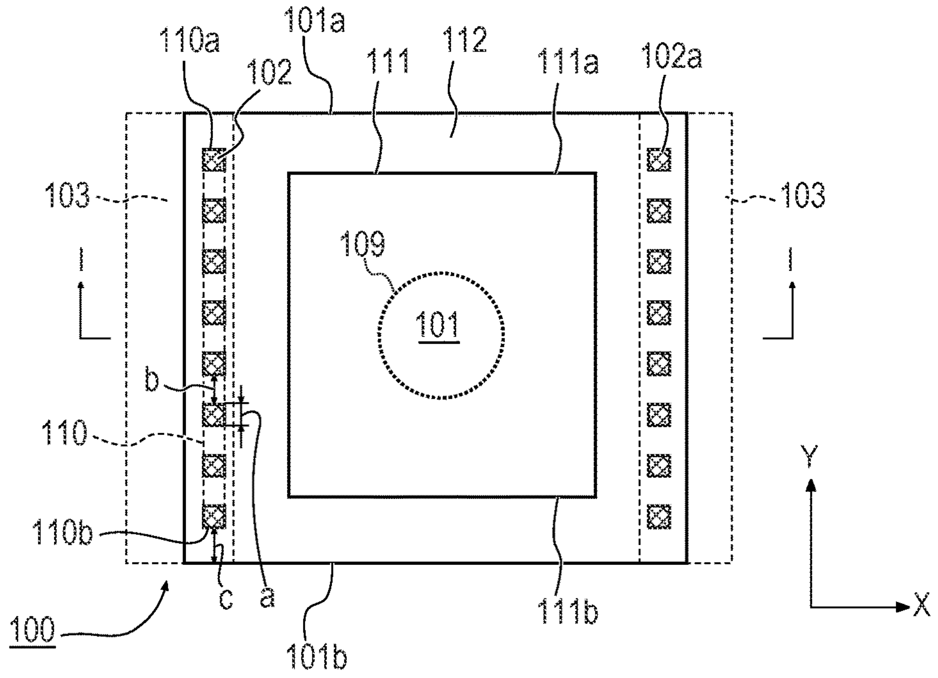
FIG. 1A is a plan view of the vicinity of a heating element according to an embodiment of the present disclosure.

A liquid ejection head can be mounted on a printer, a copying machine, a facsimile having a communication system, a word processor having a printer section, or an industrial recording apparatus combined with various processing apparatuses. By using the liquid ejection head, recording can be performed on various recording media such as paper, yarn, fiber, fabric, metal, plastic, glass, wood and ceramics.

As used herein. "record(ing)" means not only imparting an image having a meaning such as a character or a figure to the recording medium, but also imparting an image having no meaning such as a pattern.

Furthermore, the term "liquid" should be broadly interpreted and refers not only to the ink used for the recording operation, but also to the liquid used for formation of images, designs, patterns, etc. by imparting to the medium being recorded, for processing of the recording medium or for treatment of ink or recording medium. Here, the treatment of ink or recording medium refers to, for example, treatment for improving fixability due to solidification or insolubilization of the color material in the ink applied to the medium to be recorded, improving recording quality or color development, and improving image durability. Further, the "liquid" used in the liquid ejection apparatus of the present disclosure generally contains a large amount of electrolyte and has conductivity.

In the present disclosure, the description given to the members such as "first" and "second" formally indicates the order and does not specify the members themselves.

Embodiments of the present disclosure will be described below with reference to the drawings. In the following description, components having the same functions are given the same numbers in the drawings.

The liquid ejection head substrate 100 (FIGS. 1A and 1B) has an element substrate 114 and an ejection orifice forming member 108. The element substrate 114 includes a substrate 113 formed of Si and an interlayer insulating film 104 formed on the substrate 113. The element substrate 114 also includes a heating resistor layer 101A which constitutes a heating element 101 for generating heat energy for discharging a liquid provided on the upper side of the substrate 113, a protective film 105, a cavitation resistant film 106, and an adhesion improving layer 107. A temperature detecting element 116 for detecting heat generated by the heating element may be provided, and the temperature detecting element 116 is arranged under the heating resistor layer 101A. The interlayer insulating films 104 include a first interlayer insulating film 104*f* positioned between the heating resistor layer 101A and the temperature detecting element 116 and a second interlayer insulating film 104*e* positioned between the temperature detecting element 116 and a first electric wiring layer 103*d* serving as a ground wiring. The interlayer insulating films 104 include a third interlayer insulating film 104*d* positioned between the first electrical wiring layer 103*d* and a second electrical wiring layer 103*c* serving as a power supply wiring. The interlayer insulating films 104 include a fourth interlayer insulating film 104*c* positioned between the second electrical wiring layer 103*c* and a third electrical wiring layer 103*b* serving as a logic power supply wiring. The interlayer insulating films 104 include a fifth interlayer insulating film 104*b* positioned between the third electrical wiring layer 103*b* and a fourth electrical wiring layer 103*a* serving as a signal wiring, and a sixth interlayer insulating film 104*a* positioned below the fourth electrical wiring layer 103*a*.

Here, at least one of the first interlayer insulating film 104*f*, the second interlayer insulating film 104*e*, and the third interlayer insulating film 104*d* is formed of an insulator including the following SiOCN film (silicon oxynitride film). That is, at least one of the films includes a material layer represented by $Si_wO_xC_yN$ (w+x+y+z=100 (at. %), 37≤w≤60 (at. %), 30≤x≤53 (at. %), 6≤y≤29 (at. %), 4≤z≤9 (at. %)). The first interlayer insulating film 104*f*, the second interlayer insulating film 104*e*, and the third interlayer insulating film 104*d* may include not only a $Si_wO_xC_yN_z$ film but also an insulating film such as SiO formed by high-density plasma CVD in a part thereof in order to improve the adhesion property to the wiring layer. By forming a part or all of these interlayer insulating films into a $Si_wO_xC_yN_z$ film, it is possible to improve the resistant to dissolution against ink. Further, it is preferable that apart or all of the interlayer insulating films in the region close to the heating resistor layer 101A, such as the first interlayer insulating film 104*f* and the second interlayer insulating film 104*e*, be formed of a $Si_wO_xC_yN_z$ film. This is because the $Si_wO_xC_yN_T$ film has a lower thermal conductivity than the SiO film, and the energy required for driving the heating element 101 can be reduced. Since the temperature detecting element 116 is optional, when the temperature detecting element 116 is not provided, the first interlayer insulating film 104*f* and the second interlayer insulating film 104*e* are regarded as a single first interlayer insulating film, and other configurations are as described above.

Here, each of the insulating films may have a planarized upper surface in which each of the wiring layers is embedded. That is, when the interlayer insulating films are formed by laminating multiple films, the upper surface of the film in which the wiring layer is embedded may be planarized. For example, in FIG. 4, the interlayer insulating film (the second interlayer insulating film 104*e*) provided on the upper side of the wiring layer (here, corresponding to a first electric wiring layer 103*d* which is a ground wiring close to the heating element) is composed of three films 104*x*, 104*y*, and 104*z*. On the first electric wiring layer 103*d*, a second SiO film 104*z* is formed in an uneven shape in accordance with the unevenness of the wiring layer, and the $Si_wO_xC_yN_z$ film 104*x* is formed conformally on the unevenness of the second SiO film 104*z*, and further, a first SiO film 104*y* is formed thereon. The upper surface of the first SiO film 104*y* is planarized.

Figure 5:
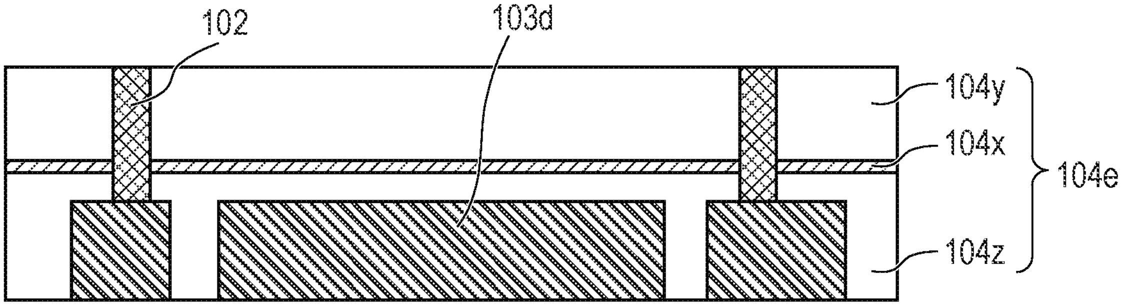
FIG. 5 is a cross-sectional view of the vicinity of an interlayer insulating film according to an embodiment.
Figure 7:
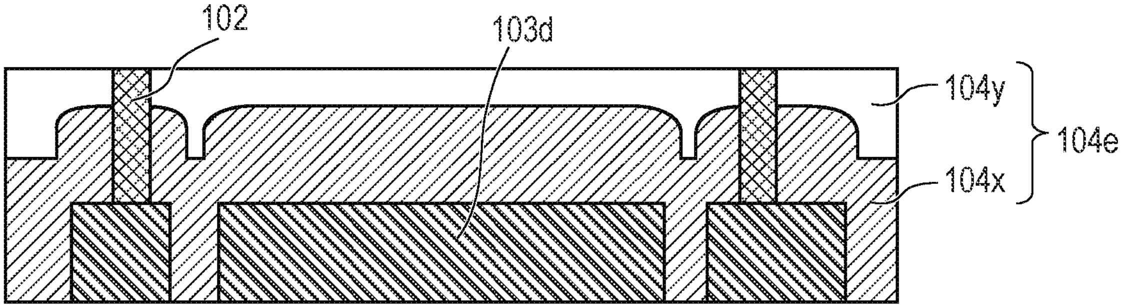
FIG. 7 is a cross-sectional view of the vicinity of an interlayer insulating film according to an embodiment.

FIGS. 5 and 7 show another embodiment of the interlayer insulating film (a second interlayer insulating film 104*e*) on the upper side of the wiring layer 103 (a first electrical wiring layer 103*d*). In the embodiment shown in FIG. 5, a second SiO film 104*z* having a planarized upper surface is disposed on a wiring layer 103*d*, a $Si_wO_xC_yN_z$ film 104*x* is disposed thereon, and a first SiO film 104*y* having a planarized upper surface is laminated thereon. In the embodiment shown in FIG. 7, a $Si_wO_xC_yN_z$ film 104*x* is formed on a wiring layer 103*d*, and a first SiO film 104*y* having a planarized upper surface is formed thereon.

Figure 4:
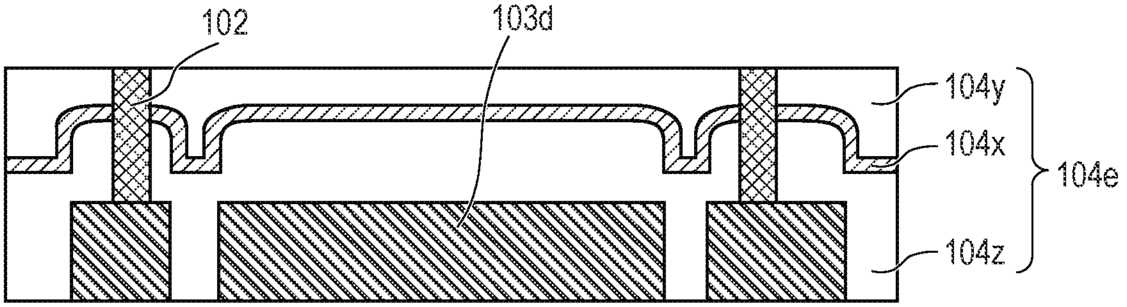
FIG. 4 is a cross-sectional view of the vicinity of an interlayer insulating film according to an embodiment.
Figure 6:
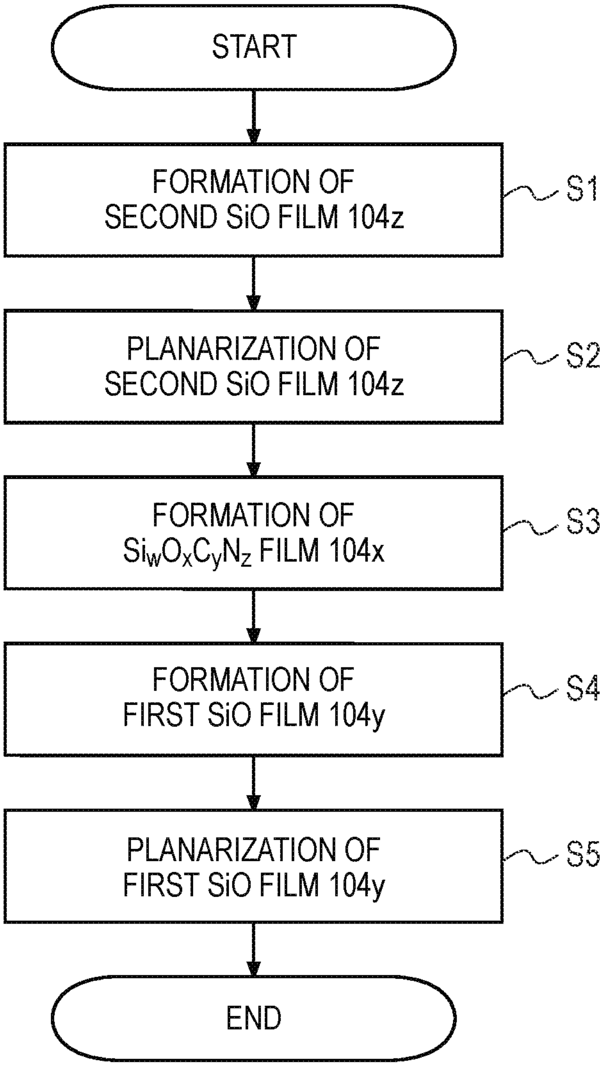
FIG. 6 is a flowchart of the process of fabricating the interlayer insulating film according to FIG. 5.

Referring back to FIG. 1B, the fourth interlayer insulating film 104*c*, the fifth interlayer insulating film 104*b*, and the sixth interlayer insulating film 104*a* are each formed of an insulator such as a SiO film. These insulating films may be formed of $Si_wO_xC_yN_z$ films. If the first SiO film 104*y* is formed on the $Si_wO_xC_yN_z$ film 104*x* of the interlayer insulating film as shown in FIGS. 4 to 6, the complication of the process can be avoided because the first SiO film 104*y* is the only film to be planarized on the upper surface. Since the $Si_wO_xC_yN_z$ film 104*x* has high liquid resistance (chemical resistance) and is difficult to be planarized by chemical polishing such as CMP, it is preferable to planarize only the SiO film.

Figure 1B:
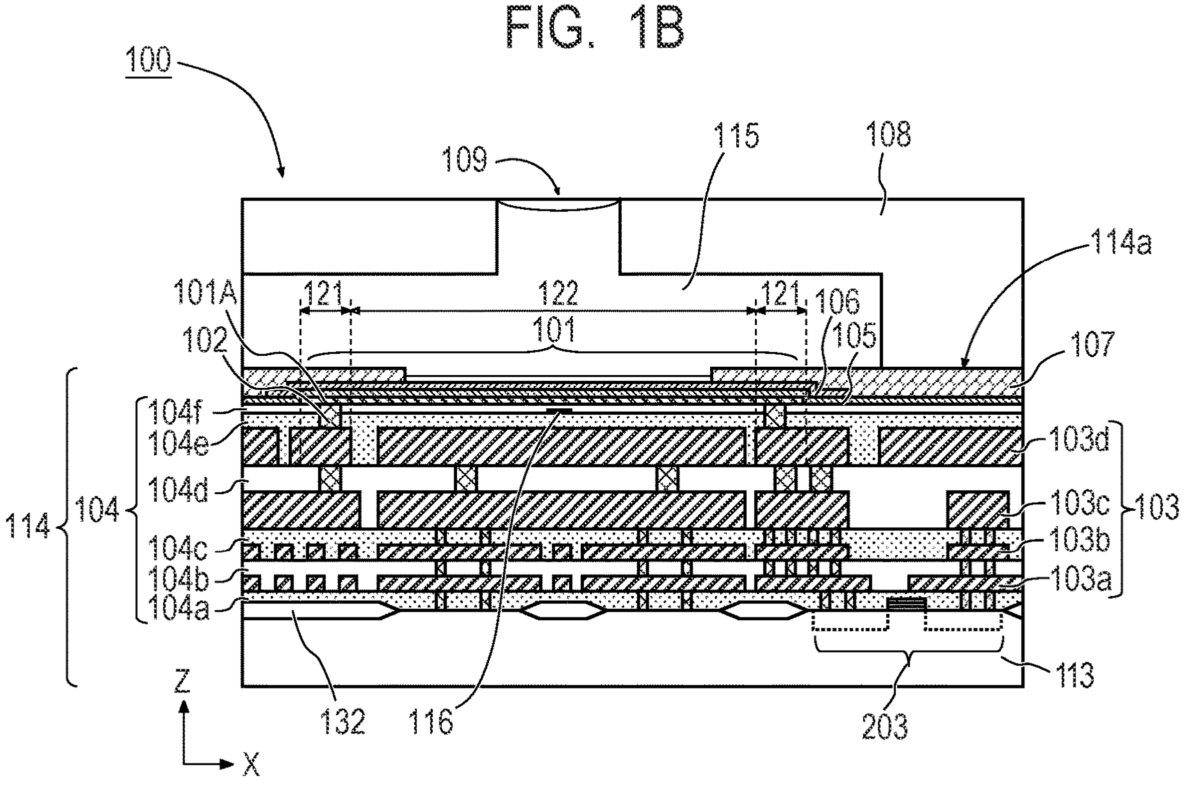
FIG. 1B is a sectional view of the vicinity of a heating element according to an embodiment of the present disclosure.
Figure 2:
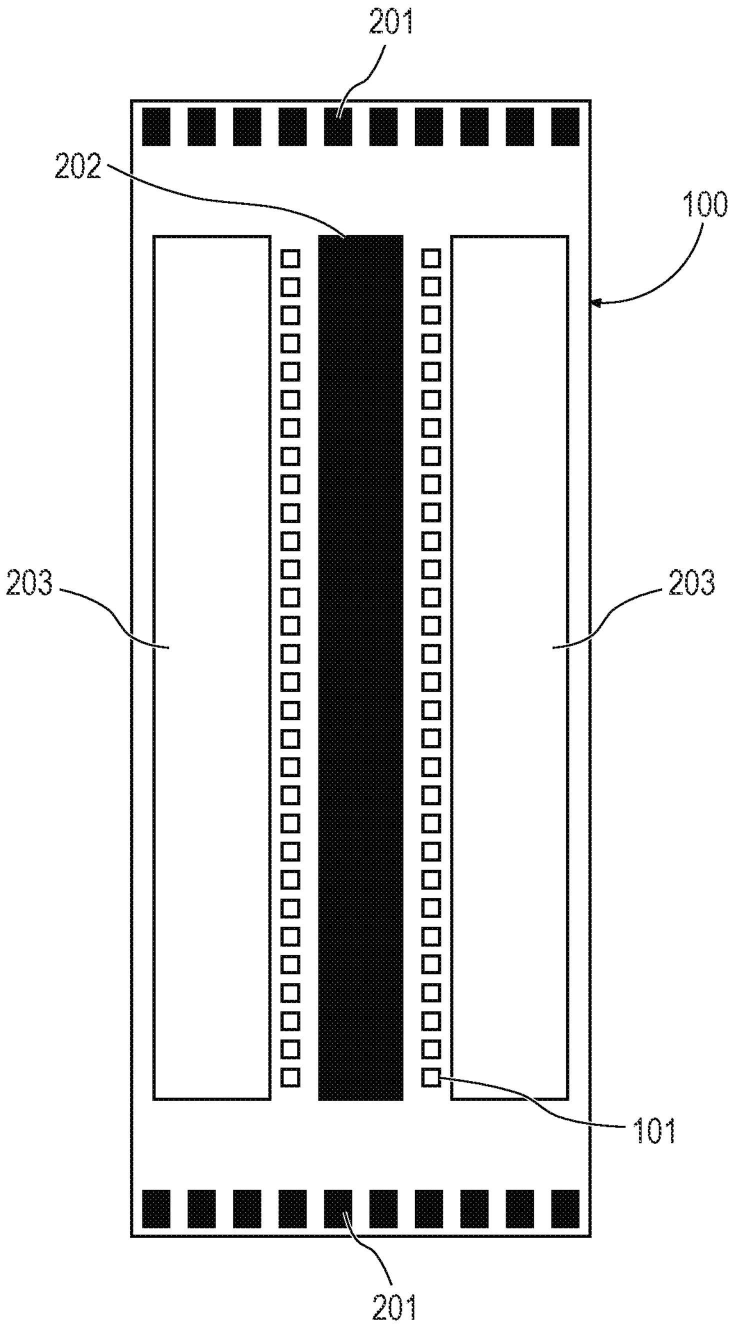
FIG. 2 is a plan view of a substrate for liquid ejection head.

As shown in FIG. 2, an ink supply orifice 202 extending in the longitudinal direction (coinciding with the Y direction in this embodiment) is provided in the central portion of a liquid ejection head substrate 100, and multiple heating elements 101 are arranged in rows on both sides of the ink supply orifice 202. The heating resistor layer 101A of the heating elements 101 is formed of a Ta compound such as TaSiN. The heating resistor layer 101A shown in FIG. 1B has a film thickness (dimension in Z direction) of about 0.01 to 0.05 μm, which is much smaller than the film thickness of the wiring layer 103 to be described later. An ejection orifice forming member 108 is provided on a surface 114*a* of the substrate 114 on which the heating element 101 is formed. The ejection orifice forming member 108 has an ejection orifice 109 corresponding to each heating element 101, and forms a pressure chamber 115 for each ejection orifice 109 together with the substrate 114. The pressure chamber 115 communicates with the ink supply orifice 202, and ink supplied from the ink supply orifice 202 is introduced into the pressure chamber 115. In addition, a temperature detecting element 116 formed of a thin film resistor such as Al, Pt, Ti, Ta or the like may be provided below the heating element 101 with an interlayer insulating film interposed therebetween.

As shown in FIG. 2, driving circuits 203 for driving a heating element 101 are provided on both sides of a liquid ejection head substrate 100 across an ink supply orifice 202. The driving circuits 203 are connected to electrode pads 201 provided on both ends of the substrate 114 in the longitudinal direction Y, and generates a driving current of the heating element 101 in response to a recording signal supplied from the outside of the liquid ejection head via the electrode pads 201. In the interlayer insulating films 104 provided on the element substrate 114, wiring layers 103 for supplying a current to the heating resistor layer 101A of the heating element 101 extend. The wiring layers 103 are provided so as to be embedded in the interlayer insulating films 104. The wiring layers 103 electrically connect the driving circuits 203 and the heating resistor layer 101A through connecting members 102 described later. The wiring layers 103 are made of, for example, aluminum, and each of the layers has a film thickness (dimension in Z direction) of about 0.6 to 1.2 μm. The heating element 101 generates heat by the supplied current, and the heating element 101 having reached a high temperature heats the ink in the pressure chamber 115 to generate bubbles. By these bubbles, ink in the vicinity of the ejection orifice 109 is ejected from the ejection orifice 109, and recording is performed. By detecting the temperature change during the above by the temperature detecting element 116, it can be determined whether the ejection is normal or not.

The heating resistor layer 101A is covered with a protective film 105. The protective film 105 is formed of SiN, for example, and has a film thickness of about 0.15 to 0.3 μm. The protective film 105 may be formed of SiO or SiC. The protective film 105 is covered with a cavitation resistant film 106. The cavitation resistant film 106 is made of Ta or the like and has a film thickness of about 0.2 to 0.3 μm. As the cavitation resistant film 106, Ir or Ta and Ir may be laminated.

Multiple connecting members 102 for connecting the wiring layers 103 and the heating resistor layer 101A are provided in the interlayer insulating films 104. Multiple connecting members 102 extending in the film thickness direction (Z direction) arranged at intervals along the second direction Y. Some connecting members 102 are covered with the heating resistor layer 101A when viewed from a direction orthogonal to a surface on which the heating element 101 is provided. Some connecting members 102 connect the wiring layers 103 and the heating resistor layer 101A in the vicinity of both side ends in the X direction of the heating element 101. Thus, current flows along the heating resistor layer 101A in the first direction X. Multiple connecting members 102 are provided in the vicinity of both side ends of the heating element 101 in the X direction. The heating resistor layer 101A has a connection region 110 to which multiple connecting members 102 are connected on one end side and the other end side, respectively. Connecting members 102 are plugs extending in the Z direction from near the end of wiring layers 103. Although the connecting member 102 has substantially square cross sections in the present embodiment, a connecting member may have rounded corners, may not be limited to have a quadrate shape, and may have other shapes such as a rectangular shape, a circular shape, an elliptical shape, or the like. The connecting member 102 is metal plug, and typically formed of tungsten, but may be formed of any of titanium, platinum, cobalt, nickel, molybdenum, tantalum, silicon (polysilicon), or a compound containing any of these. The connecting member 102 may be integrally formed with the wiring layer 103. That is, a part of the wiring layer 103 may be cut off in the thickness direction to form the connecting member 102 integrated with the wiring layer 103.

The connection region 110 is a minimum rectangular region including all connecting members 102 and whose four sides circumscribe any of connecting members 102. The connection region 110 extends along a second direction Y orthogonal to the first direction X, but the second direction may not be orthogonal to the first direction X. That is, the connection region 110 may extend along a second direction that intersects the first direction X at an angle. The region actually contributing to the foaming of the ink in the heating element 101, that is, the region where the ink foams is called the foaming region 111. The foaming region 111 is located inside the outer periphery of the heating element 101, and a region between the foaming region 111 and the outer periphery of the heating element 101 is a region (hereinafter referred to as frame region 112) not contributing to foaming of ink. Even in the frame region 112, heat is generated by energization, but the amount of heat radiation to the surroundings is large, and ink does not foam. The X and Y dimensions of the foamed region 111 are determined by the structure around the heating resistor layer 101A and the thermal conductivity of the heating resistor layer 101A. The connection region 110 is adjacent to the foaming region 111 in the first direction X across the frame region 112, and extends a range including the entire length of the foaming region 111 in the second direction Y. That is, when viewed in the first direction X, both side edges 110*a*, 110*b* of the connection region 110 with respect to the Y direction are closer to both side peripheral edges 101 *a*, 101*b* with respect to the Y direction of the heating resistor layer 101A than both side peripheral edges 111*a*, 111*b* with respect to the Y direction of the foaming region 111. Therefore, the current density is made uniform in the whole area of the foaming region 111.

The underlying portion of each of the wiring layers 103 and the heating resistor layer 101A are planarized by a process such as chemical mechanical polishing (CMP: Chemical Mechanical Polishing). Therefore, as shown in FIG. 1B, contact surfaces of the connecting members 102 with the heating resistor layer 101A and a contact surface of the interlayer insulating film 104 with the heating resistor layer 101A are provided on the same plane. In this embodiment, as shown in FIG. 1B, a driving circuit 203 and a field oxide film 132 are formed in an interface region of the substrate 113 formed of Si and the interlayer insulating film 104.

In FIG. 1B, the wiring layers 103 have a structure of 4 layers with different distances from the heating resistor layer 101A. The wiring layers 103*a* and 103*b* on the lower layer side are assigned to a signal wiring layer and a logic power supply wiring layer (the fourth electrical wiring layer 103*a* and the third electrical wiring layer 103*b*) for driving the heating element 101. Also, the wiring layers 103*c* and 103*d* on the upper layer side (the side closer to the protective film 105) are assigned to wiring layers for supplying a current to the heating element 101. In this embodiment, the wiring layer 103*d* is a ground (GNDH) wiring layer (the first electric wiring layer 103*d*), and the wiring layer 103*c* is a power supply (VH) wiring layer (the second electric wiring layer 103 *c*), and both the wiring layers 103*c* and 103*d* are so-called solid wiring.

In the present embodiment, 4 layers of wiring layers 103 are disposed in the interlayer insulating films 104. Specifically, the first and the second electric wiring layers 103*d* and 103*c* for passing a current to the heating element 101, and the third and the fourth electric wiring layers 103 *b* and 103*a* for signal wiring and logic power wiring for driving the heating element are disposed. The first and the second electric wiring layers 103*d*, 103*c* are arranged on the side close to the heating element 101 with respect to the third and the fourth electric wiring layers 103 *b*, 103 *a*, and the film thickness of each of the first and the second electric wiring layers 103*d*, 103*c* is preferably relatively thick in view of efficiency. Conversely, the third and the fourth electric wiring layers 103*b*, 103*a* are disposed closer to the driving circuit 203 with respect to the first and the second electric wiring layers 103*d*, 103*c*, and the film thickness each thereof is preferably relatively small.

As shown in FIGS. 1A and 1B, the heating element 101 is partitioned in a first direction X into two electrode regions 121 each including a connection region 110 and a central region 122 located between the two electrode regions 121.

The two electrode regions 121 and the central region 122 have the same dimensions in the second direction Y. That is, the heating element 101 has a rectangular planar shape in the X-Y plane as shown in FIG. 1A. In the present embodiment, the width a of the connecting member 102, the interval b, and the overlap width c of the heating element 101 are optimized on the assumption of the shape of the heating element 101. Here, the width a of the connecting member 102 is the Y-direction width of the connecting member 102, the interval b of the connecting member 102 is the interval in the second direction Y of the adjacent connecting member 102, and the overlap width c is the distance between the connecting member 102 at both ends and the peripheral edges 101*a*, 101*b* of the heating element 101.

Figure 3:
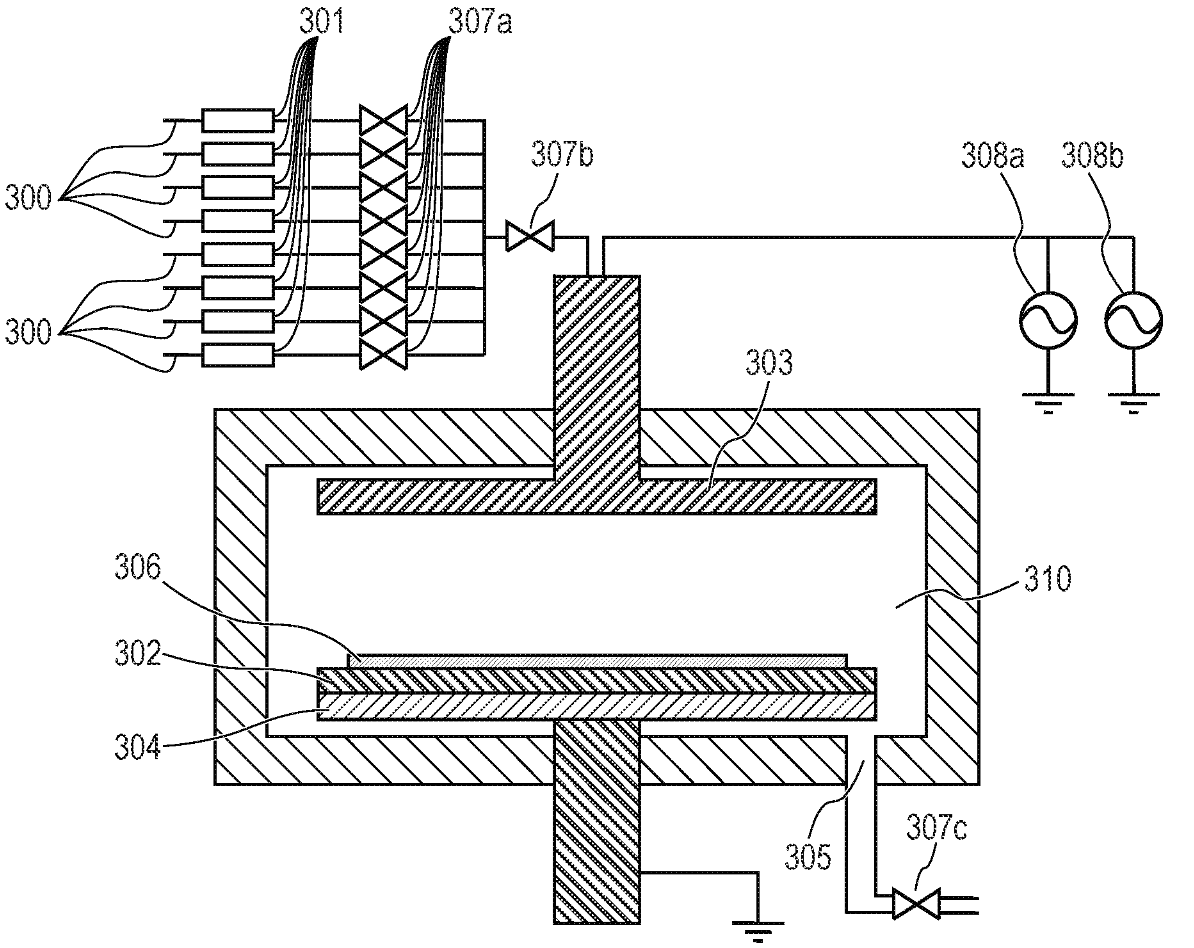
FIG. 3 is a sectional view schematically showing an apparatus for forming a $Si_wO_xC_yN_z$ film.

The $Si_wO_xC_yN_z$ film according to the present disclosure can be formed by using a plasma CVD method. FIG. 3 is a sectional view schematically showing a film formation chamber of a plasma CVD apparatus used for forming a $Si_wO_xC_yN_z$ film in the present disclosure. A method of forming a $Si_wO_xC_yN_z$ film will be described below with reference to FIG. 3.

First, the distance (gap) between the showerhead 303 functioning as an upper electrode in plasma discharge and the sample stage 302 functioning as a lower electrode is determined by adjusting the height of the sample stage 302. The temperature of the sample stage 302 is adjusted by heating by a heater 304.

Next, various gases to be used flow into the film forming chamber 310 through the showerhead 303. In this case, the flow rate of the various gases is controlled by a mass flow controller 301 attached to each corresponding pipe 300. Thereafter, by opening the introduction valve 307 of the gas to be used, the gas is mixed in the piping and supplied to the showerhead 303. Subsequently, the exhaust valve 307 *b* attached to the exhaust orifice 305 connected to the vacuum pump (not shown) is adjusted to control the exhaust amount, thereby keeping the pressure in the film forming chamber 310 constant. Plasma is then discharged between showerhead 303 and sample stage 302 by 2 frequency RF power supplies 308*a* and 308*b*. The atoms dissociated in the plasma are deposited on the wafer 306 to form a film.

As the process gas, a Si source gas for supplying silicon, an N source gas for supplying nitrogen, a C source gas for supplying carbon, an O source gas for supplying oxygen, and a carrier gas for carrying these gases as necessary are used. As the Si source gas, silane gas ($SiH_4$), dichlorosilane ($SiH_2Cl_2$) or the like can be used. As the N source gas, nitrous oxide ($N_2O$) serving also as ammonia gas or the O source gas can be used. Lower alkanes (methane ($CH_4$) and ethane ($C_2H$)) can be used as the C source gas. As the O source gas, oxygen ($O_2$), ozone ($O_3$), nitrogen monoxide (NO), carbon monoxide (CO), water ($H_2O$) or the like can be used. As the carrier gas, inert rare gas, nitrogen gas or hydrogen gas can be used.

EXAMPLES

Hereinafter, the present disclosure will be specifically described with reference to examples, but the present disclosure is not limited to these examples.

The conditions for the formation of the $Si_wO_xC_yN_z$ film according to the present disclosure are appropriately selected from the following.

$SiH_4$ gas flow rate: 0.02 to 0.3 slm
$N_2O$ gas flow rate: 0.1 to 3 slm
$CH_4$ gas flow rate: 0.1 to 5 slm
HRF power: 100 to 900 W
LRF power: 8 to 500 W
Pressure: 100 to 700 Pa
Temperature: 300 to 450° C.

By adjusting these conditions and changing the flow rates of the process gases $SiH_4$, $N_2O$ and $CH_4$, $Si_wO_xC_yN_z$ films having different composition ratios can be obtained. As a result, $Si_wO_xC_yN_z$ films of the standards A to K shown in Table 1 were obtained. In this specification, the content ratio of each element in the $Si_wO_xC_yN_z$ film is expressed by an atomic percentage (at. %). The $Si_wO_xC_yN_z$ films formed in the present disclosure contain hydrogen derived from the source gas of the CVD method described above, but the hydrogen content is not considered. The film formed by using the process gas described above generally contains about 15 to 30 (at. %) of hydrogen, and may contain hydrogen as long as it does not greatly deviate from the range. The $Si_wO_xC_yN_z$ film with w≤36 and the $Si_wO_xC_yN_T$ film with z≥10 could not be formed by varying the flow rates of the process gases $SiH_4$, $N_2O$ and $CH_4$.

TABLE 1

| Sample | Process gas flow rate ratio | | | $Si_wO_xC_yN_z$ | | | |
|---|---|---|---|---|---|---|---|
| Name | $SiH_4$ | $N_2O$ | $CH_4$ | w | x | y | z |
| A | 1 | 20 | 5 | 39 | 52 | 3 | 6 |
| B | 1 | 20 | 10 | 39 | 48 | 6 | 7 |
| C | 1 | 125 | 250 | 38 | 42 | 18 | 2 |
| D | 1 | 20 | 20 | 39 | 41 | 12 | 8 |
| E | 1 | 80 | 160 | 38 | 40 | 18 | 4 |
| F | 1 | 20 | 30 | 38 | 39 | 15 | 8 |
| G | 1 | 40 | 80 | 37 | 38 | 18 | 7 |
| H | 1 | 20 | 50 | 38 | 33 | 22 | 7 |
| I | 1 | 2.5 | 1.3 | 53 | 32 | 6 | 9 |
| J | 1 | 20 | 70 | 38 | 30 | 25 | 7 |
| K | 1 | 20 | 80 | 37 | 28 | 28 | 7 |

Experimental examples for determining the performance of the $Si_wO_xC_yN_z$ films from A to K in Table 1 will be shown below. In the following experimental examples, a SiO film was added as the standard L, and similar experiments were performed for all films.

Experimental Example 1

The following experiments were carried out to confirm the erosion resistance of each $Si_wO_xC_yN_z$ film to ink. First, each $Si_wO_xC_yN_z$ film was formed on a silicon substrate. Thereafter, the substrate on which the $Si_wO_xC_yN_z$ film was formed was cut to a size of 20 mm×20 mm. The cut piece was immersed in 30 ml of pigment ink having a pH of about 9, heated at 60° C. and left for 72 hours to examine the amount of dissolution. In the above experiment, the back surface and the side surface of the substrate were protected with an ink-insoluble resin in order to eliminate the influence of Si exposed to the end surface and the back surface of the substrate being dissolved. The film thickness was measured by using a spectroscopic ellipsometer in this experimental example.

In this experiment, the erosion resistance of the $Si_wO_xC_yN_z$ film against the ink was confirmed by examining the change of the film thickness. The results are shown in Table 2. As the criterion in this experiment, a case in which the amount of dissolution was less than 1 nm was determined as A, a case in which the amount of dissolution was 1 nm or more and less than 10 nm was determined as B, a case in which the amount of dissolution was 10 nm or more and less than 30 nm was determined as C, and a case in which the amount of dissolution was 30 nm or more was determined as D.

In the above criteria, A is very effective, B is effective, C is less effective, and D is almost ineffective. The same judgement was also applied to the results of the following experimental examples.

TABLE 2

| Sample name | $Si_wO_xC_yN_z$ w | x | y | z | Amount of dissolution in exepriment example 1 [nm] | Evaluation of erosion resistance in experiment example 1 |
|---|---|---|---|---|---|---|
| A | 39 | 52 | 3 | 6 | 69 | D |
| B | 39 | 48 | 6 | 7 | 25.5 | C |
| C | 38 | 42 | 18 | 2 | 0.9 | A |
| D | 39 | 41 | 12 | 8 | 2.1 | B |
| E | 38 | 40 | 18 | 4 | 0.7 | A |
| F | 38 | 39 | 15 | 8 | 0.4 | A |
| G | 37 | 38 | 18 | 7 | 0.5 | A |
| H | 38 | 33 | 22 | 7 | 0.1 | A |
| I | 53 | 32 | 6 | 9 | 29.1 | C |
| J | 38 | 30 | 25 | 7 | 0.9 | A |
| K | 37 | 28 | 28 | 7 | 0.6 | A |
| L | P—SiO | | | | 249 | D |

From the results shown in Table 2, it can be seen that the composition range of the $Si_wO_xCN$, film satisfying the erosion resistance to the ink is 6≤y (at. %). In particular, it is effective to use a $Si_wO_xC_yN_z$ film within this composition range when a pigment ink is used. Similar results were obtained for the pigment ink and the dye ink having a pH of about 5 to 11.

Experimental Example 2

The following experiment was carried out to confirm the electrical insulation of each of the above $Si_wO_xC_yN_z$ films. First, on a silicon substrate on which a silicon thermal oxide film having a film thickness of 1 μm was formed, a metal layer made mainly of aluminum was formed to have a thickness of 200 nm and processed to have a size of 2.5 mm 2.5 mm for use as a first electrode. A $Si_wO_xC_yN_z$ film having a thickness of 300 nm was formed on the first electrode, and a metal layer containing aluminum as a main material was formed thereon as a second electrode. The metal film had a thickness of 200 nm and a shape of 2 mm×2 mm, and was formed so as not to protrude from the area directly above the first electrode. Then, a through hole for making electrical contact with the first electrode was opened in the $Si_wO_xC_yN_z$ film. Using such a sample, a current amount was measured when a voltage of 32 V was applied between the first electrode and the second electrode.

In this experiment, the electrical insulation of the $Si_wO_xC_yN_z$ film was confirmed by measuring the current. The results are shown in Table 3. The criterion in this experiment was as follows. A current amount of less than 0.1 mA was defined as A, a current amount of 0.1 mA or more and less than 10 mA was defined as B, a current amount of 10 mA or more and less than 100 mA was defined as C, and a current amount of 100 mA or more was defined as D.

TABLE 3

| Sample name | $Si_wO_xC_yN_z$ w | x | y | z | Current value in experimental example 2 [nA] | Evaluation of insulation in experimental example 2 |
|---|---|---|---|---|---|---|
| A | 39 | 52 | 3 | 6 | 0.08 | A |
| B | 39 | 48 | 6 | 7 | 0.09 | A |
| C | 38 | 42 | 18 | 2 | 0.09 | A |
| D | 39 | 41 | 12 | 8 | 0.07 | A |
| E | 38 | 40 | 18 | 4 | 0.08 | A |
| F | 38 | 39 | 15 | 8 | 0.14 | B |
| G | 37 | 38 | 18 | 7 | 0.19 | B |
| H | 38 | 33 | 22 | 7 | 4.99 | B |
| I | 53 | 32 | 6 | 9 | 20 | C |
| J | 38 | 30 | 25 | 1 | 45.47 | C |
| K | 37 | 28 | 28 | 7 | 121.62 | D |
| L | P—SiO | | | | 0.07 | A |

From the results shown in Table 3, it can be seen that the composition range of the $Si_wO_xC_yN_z$ film satisfying practical electrical insulating properties is 30≤x (at. %).

Experimental Example 3

The following experiment was carried out to measure the stress of each of the $Si_wO_xC_yN_z$ films of the present disclosure. A $Si_wO_xC_yN_z$ film was formed on a silicon substrate, and the stress was measured by a stress measuring instrument. The results are shown in Table 4. The value of the stress 0 or more indicates tensile stress, and the value less than 0 indicates compressive stress. The criteria for this experiment is as follows. An absolute value of stress of less than 150 MPa was defined as A, an absolute value of stress of 150 MPa or more but less than 400 MPa was defined as B, an absolute value of stress of 400 MPa or more but less than 500 MPa was defined as C, and an absolute value of stress of 500 MPa or more was defined as D.

TABLE 4

| Sample name | $Si_wO_xC_yN_z$ w | x | y | z | Stress in experiment Example 3 [MPa] | Evaluation of stress in experiment example 3 |
|---|---|---|---|---|---|---|
| A | 39 | 52 | 3 | 6 | −60 | A |
| B | 39 | 48 | 6 | 7 | −69 | A |
| C | 38 | 42 | 18 | 2 | −581 | D |
| D | 39 | 41 | 12 | 8 | −104 | A |
| E | 38 | 40 | 18 | 4 | −497 | C |
| F | 38 | 39 | 15 | 8 | −143 | A |
| G | 37 | 38 | 18 | 7 | −353 | B |
| H | 38 | 33 | 22 | 7 | −250 | B |
| I | 53 | 32 | 6 | 9 | −80 | A |
| J | 38 | 30 | 25 | 7 | −335 | B |
| K | 37 | 28 | 28 | 7 | −378 | B |
| L | P—SiO | | | | −112 | A |

From the results shown in Table 4, it can be seen that the composition range of the $Si_wO_xC_yN_z$ film satisfying the low stress is 4≤z (at. %).

The results of the experimental examples 1 to 3 are summarized in Table 5. The lowest evaluation among the results of each experiment was used for the overall judgement. The standards for which the overall judgement was B or C were the standards B, D, E, F, G, H, I and J.

The interlayer insulating film 104 of the element substrate 114 of the liquid discharge head is required to have the performance mentioned in the above experimental examples 1 to 3. Considering the results of the experimental examples and the fact that the $Si_wO_xC_yN_z$ film with w≤36 and the $Si_wO_xC_yN_z$ film with z≥10 could not be formed, the composition of the $Si_wO_xC_yN_z$ film satisfying each performance is as follows. First, it is required to satisfy w+x+y+z=100 (at %), 37≤w (at. %), 30≤x (at. %), 6≤y (at. %), 4≤z≤9 (at. %). Since w+x+v+z=100 (at %), the upper limit for w, y, or y is w≤60 (at. %), x≤53 (at. %), y≤29 (at. %) respectively. Therefore, the composition of the $Si_wO_xC_yN_z$ film capable of exhibiting the desired performance is w+x+y+z=100 (at. %), 37≤w≤60 (at. %), 30≤x≤53 (at. %), 6≤y≤29 (at. %), 4≤z≤9 (at. %).

Further, since the standards for which the overall judgement was B were the standards D, F, G and H, it is more preferable that 37≤w≤39 (at. %), 33≤x≤41 (at. %), 12≤y≤22 (at. %), 7≤z≤8 (at. %) are satisfied in the $Si_wO_xC_yN_z$ film.

TABLE 5

| Sample name | $Si_wO_xC_yN_z$ w | x | y | z | Erosion resistance | Insulating property | Stress | Overall judgment |
|---|---|---|---|---|---|---|---|---|
| A | 39 | 52 | 3 | 6 | D | A | A | D |
| B | 39 | 48 | 6 | 7 | C | A | A | C |
| C | 38 | 42 | 18 | 2 | A | A | D | D |
| D | 39 | 41 | 12 | 8 | B | A | A | B |
| E | 38 | 40 | 18 | 4 | A | A | C | C |
| F | 38 | 39 | 15 | 8 | A | B | A | B |
| G | 37 | 38 | 18 | 7 | A | B | B | B |
| H | 38 | 33 | 22 | 7 | A | B | B | B |
| I | 53 | 32 | 6 | 9 | C | C | A | C |
| J | 38 | 30 | 25 | 7 | A | C | B | C |
| K | 37 | 28 | 28 | 7 | A | D | B | D |
| L | P—SiO | | | | D | A | A | D |

Example 1

In this example, liquid ejection was actually performed using the various liquid ejection heads that were prepared. In this example, $Si_wO_xC_yN_z$ films were used for the interlayer insulating films 104 *d*, 104 *e*, and 105*f* As a result, with respect to the liquid ejection head using each of the standards of B, D to J shown in Table 5 as the interlayer insulating film, even when an accidental disconnection occurred, the adjacent element was not affected, the warpage of the substrate was small, and no electrical failure occurred.

On the other hand, with respect to the liquid ejection head using the standard K as the interlayer insulating films 104 *d*, 104 *e*, and 105 *f*, the ejection performance remarkably deteriorated because a leakage current was generated between the wiring layers. With respect to the liquid ejection head using the standard C as the interlayer insulating films, no defect occurred, but the substrate warped greatly, and a transport error and a suction error occurred in part of the head manufacturing process.

With respect to each of the liquid ejection heads using the standards A and L (SiO film) as the interlayer insulating films, although no defect usually occurred, when ejection was continued after an accidental disconnection had occurred, elements adjacent to the disconnection element also failed ejection. As the ejection continued, the range of elements that failed to eject increased. Thereafter, when ejection was continued, electrical failure occurred, and driving of the head became impossible. After the ejection durability test, the liquid ejection head was disassembled, and the cross section of the substrate for liquid ejection head was observed using a focused ion beam device and a scanning electron microscope. In a wide range of the region where the ejection failure occurred, there was a trace that ink had penetrated into the inside, the interlayer insulating film 104*f* and the interlayer insulating film 104*e* were dissolved, and the electric wiring layer 103*d* was also dissolved. In some regions, the interlayer insulating film 104*d* and the electric wiring layer 103*c* were also dissolved.

Example 2 in this example, the liquid ejection head was prepared using a $Si_wO_xC_yN_z$ film of each of the standards B, D to J for the interlayer insulating film 104*d* and SiO films for the other interlayer insulating films. There was no defect during normal operation. However, when ejection was continued after the occurrence of accidental disconnection, in case that the wiring layer 103*d* was a solid wiring, the elements adjacent to the disconnected element failed to eject, and as the ejection continued, the range of elements that failed to eject increased. Further ejection was continued thereafter, but the failure of driving of the head due to the occurrence of an electrical failure did not occur. In case that an individual wiring was used as the wiring layer 103*c*, the disconnection did not spread widely even after the occurrence of accidental disconnection of the head.

After the ejection durability test, the liquid ejection head was disassembled, and the cross section of the substrate for liquid ejection head was observed using a focused ion beam device and a scanning electron microscope. In a wide range of the region where the ejection failure occurred, there was a trace that ink had penetrated into the inside, the interlayer insulating film 104*f* and the interlayer insulating film 104*e* were dissolved, and the electric wiring layer 103*d* was also dissolved. However, the dissolution of the interlayer insulation film 104*d* ($Si_wO_xC_yN_z$ film) was not found.

Example 3

In this example, the liquid ejection head was prepared using a $Si_wO_xC_yN_z$ film of each of the standards B, D to J for the interlayer insulating film 104*e* and SiO films for the other interlayer insulating films. The disconnection did not spread widely even after the occurrence of accidental disconnection of the head.

Further, when each of B, D to J was used, the energy required for driving the heating element was reduced as compared with the case of using the SiO film. When the thermal conductivity was measured, the thermal conductivity of the $Si_wO_xC_yN_z$ film was lower than that of the SiO film. Therefore, the reduction of the required energy was considered to be caused by the high heat storage property.

Example 4

In this example, the liquid ejection head was prepared using a $Si_wO_xC_yN_z$ film of each of the standards B, D to J for the interlayer insulating film 104*f* and SiO films for the other interlayer insulating films. The disconnection did not spread widely even after the occurrence of accidental disconnection of the head.

The energy required for driving each heating element was reduced as compared with the case where the SiO film was used also in this example. In this example, since the $Si_wO_xC_yN_z$ film is closer to the heating resistance element than in the example 3, the energy required for driving was even smaller than in example 3.

Example 5

This example was performed in the same manner as Example 3, except that the interlayer insulating film 104*e* was formed as having the second SiO film 104*z*, the $Si_wO_xC_yN_z$ film 104*x*, and the first SiO film 10 *y*, as shown in FIG. 4. The thicknesses of the first and second SiO films and the $Si_wO_xC_yN_z$ film 104 *x* were varied. When the thickness of the $Si_wO_xC_yN_z$ film 104 *x* was 150 nm or more, the disconnection did not spread over a wide range even after an accidental disconnection occurred in the head.

Further, in the present example, since the first SiO film 104*y* is the only film to be planarized in manufacturing process, the complication of the step could be avoided.

Example 6

This example was performed in the same manner as example 5, except that the interlayer insulating film 104*e* was formed to include a planarized second SiO film 104*z* and a $Si_wO_xC_yN_z$ film 104 *x* formed thereon as shown in FIG. 5. A flow chart of the film formation is shown in FIG. 6. First, the second SiO film 104*z* was formed on the substrate on which the ground wiring 103*d* was formed (S1). Next, the second SiO film 104*z* was planarized by CMP (S2), and a $Si_wO_xC_yN_z$ film 104 *x* was formed thereon (S3). Subsequently, the first SiO film 104 *y* was formed on the $Si_wO_xC_yN_z$ film 104 *x* (S4) and planarized (S5). When the thickness of the $Si_wO_xC_yN_z$ film 104*x* was varied, if the thickness of the $Si_wO_xC_yN_z$ film 104*x* was 100 nm or more, the disconnection did not spread over a wide range even after an accidental disconnection occurred in the head. By planarizing the second SiO film 104*z*, the effect was observed even when the thickness of the $Si_wO_xC_yN_z$ film 104*x* was thinner than that of Example 5.

Example 7

This example was performed in the same manner as Example 3, except that the interlayer insulating film 104*e* was formed to include, the $Si_wO_xC_yN_z$ film 104*x* formed on the ground wiring 103*d* and the first SiO film 104*y* formed thereon, as shown in FIG. 7. When the thickness of each of the first SiO film 104*y* and the $Si_wO_xC_yN_z$ film 104*x* was varied, if the thickness of the $Si_wO_xC_yN_z$ film 104*x* was 150 nm or more, the disconnection did not spread over a wide range even after an accidental disconnection occurred in the head.

In this example, since the number of times of film formation is smaller than that in Examples 5 and 6, it is possible to avoid the complication of the process.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-189845, filed Nov. 13, 2020, which is hereby incorporated by reference herein in its entirety.

What is claimed is:

1. A substrate for a liquid ejection head comprising:

a base material;

a heating element comprising a heating resistor layer for generating thermal energy for discharging a liquid;

a wiring layer for supplying electric power to the heating element; and an insulating film for insulating the wiring layer, wherein at least a part of the said insulating film includes a material layer represented by $Si_wO_xC_yN_z$, and wherein w+x+y+z=100 at %, 37≤w≤60 at. %, 30≤x≤53 at. %, 6≤y≤29 at. %, and 4≤z≤9 at. %.

2. The substrate for a liquid ejection head according to claim 1, wherein ranges w, x, y and z in the material layer represented by said $Si_wO_xC_yN_z$ satisfy 37≤w≤39 at. %, 33≤x≤41 at. %, 12≤y≤22 at. % and 7≤z≤8 at. %.

3. The substrate for a liquid ejection head according to claim 1 comprising multiple wiring layers, wherein the insulating film consists of multiple interlayer insulating films, and the multiple interlayer insulating films comprise:

a first interlayer insulating film for insulating the heating resistor layer and a first wiring layer adjacent to the heating resistor layer, and a second interlayer insulating film for insulating the first wiring layer and a second wiring layer adjacent to the second interlayer insulating film, wherein at least a part of the first interlayer insulating film and the second interlayer insulating film comprises a material layer represented by said $Si_wO_xC_yN_z$.

4. The substrate for a liquid ejection head according to claim 3, wherein at least a part of the first interlayer insulating film comprises a material layer represented by said $Si_wO_xC_yN_z$.

5. The substrate for a liquid ejection head according to claim 3, wherein at least a part of the second interlayer insulating film comprises a material layer represented by said $Si_wO_xC_yN_z$.

6. The substrate for a liquid ejection head according to claim 3 further comprising a temperature detecting element for detecting a temperature of the heating element.

7. The substrate for a liquid ejection head according to claim 6, wherein the temperature detecting element is disposed below the heating resistor layer of the heating element, wherein the multiple interlayer insulating films comprise a further interlayer insulating film for insulating the temperature detecting element and the heating resistor layer, and wherein at least a part of the further interlayer insulating film comprises a material layer represented by said $Si_wO_xC_yN_z$.

8. The substrate for a liquid ejection head according to claim 7, wherein the multiple interlayer insulating films comprise a still further interlayer insulating film for insulating the temperature detecting element and the wiring layer, and wherein at least a part of the still further interlayer insulating film comprises a material layer represented by said $Si_wO_xC_yN_z$.

9. The substrate for a liquid ejection head according to claim 3, wherein at least one of the multiple interlayer insulating films is a first SiO film in which an upper surface is planarized and the wiring layer is embedded.

10. The substrate for a liquid ejection head according to claim 9, wherein the at least one of the multiple interlayer insulating films comprises a material layer represented by said $Si_wO_xC_yN_z$ disposed on the wiring layer and the first SiO film disposed on the material layer.

11. The substrate for a liquid ejection head according to claim 10, wherein the thickness of the material layer represented by said $Si_wO_xC_yN_z$ is 150 nm or more.

12. The substrate for a liquid ejection head according to claim 3, wherein at least one of the multiple interlayer insulating films comprises a second SiO film disposed on the wiring layer and a material layer represented by said $Si_wO_xC_yN_z$ disposed on the second SiO film.

13. The substrate for a liquid ejection head according to claim 12, wherein the second SiO film is planarized.

14. The substrate for a liquid ejection head according to claim 12, wherein the thickness of the material layer represented by said $Si_wO_xC_yN_z$ is 100 nm or more.

15. A liquid ejection head comprising:

a substrate for a liquid ejection head comprising a base material, a heating element comprising a heating resistor layer for generating thermal energy for discharging a liquid, a wiring layer for supplying electric power to the heating element and an insulating film for insulating the wiring layer, and an ejection orifice forming member, wherein at least a part of the said insulating film includes a material layer represented by $Si_wO_xC_yN_z$, and wherein $w+x+y+z=100$ at %, $37 \leq 2 \leq 60$ at. %, $30 \leq x \leq 53$ at. %, $6 \leq y \leq 29$ at. %, and $4 \leq z \leq 9$ at. %.

* * * * *